United States Patent
Okuyama

(10) Patent No.: US 6,767,630 B2
(45) Date of Patent: Jul. 27, 2004

(54) ADHESIVE SHEET AND FLOOR SURFACE COVERED STRUCTURE

(75) Inventor: Takahide Okuyama, Yamagata (JP)

(73) Assignee: 3M Innovative Properties Company, St. Paul, MN (US)

(*) Notice: Subject to any disclaimer, the term of this patent is extended or adjusted under 35 U.S.C. 154(b) by 131 days.

(21) Appl. No.: 10/220,835

(22) PCT Filed: Apr. 6, 2001

(86) PCT No.: PCT/US01/11200

§ 371 (c)(1),
(2), (4) Date: Sep. 5, 2002

(87) PCT Pub. No.: WO01/76867

PCT Pub. Date: Oct. 18, 2001

(65) Prior Publication Data

US 2003/0044600 A1 Mar. 6, 2003

(30) Foreign Application Priority Data

Apr. 7, 2000 (JP) .......................... 2000-11928

(51) Int. Cl.⁷ .......................... B32B 27/08; C09J 7/02; E04F 15/10
(52) U.S. Cl. .................. 428/354; 428/401.1; 428/40.7; 428/41.7; 428/42.1; 428/323; 428/328; 428/329; 428/343; 428/353
(58) Field of Search ................ 428/40.1, 40.7, 428/41.7, 42.1, 323, 328, 329, 343, 353, 354

(56) References Cited

U.S. PATENT DOCUMENTS 4,418,109 A * 11/1983 Miller, Jr. et al. .......... 428/142
4,608,287 A    8/1986 Biotteau ........................ 428/40
5,246,765 A *  9/1993 Lussi et al. .................. 428/203
5,506,030 A *  4/1996 Landers et al. ............. 428/143
2003/0044600 A1 * 3/2003 Okuyama ................... 428/343

FOREIGN PATENT DOCUMENTS

| JP | 01-011752 | 1/1989 |
| JP | 01-058543 | 3/1989 |
| JP | 06-240201 | 8/1994 |
| JP | 08-118553 | 5/1996 |
| JP | 10-095087 | 4/1998 |
| JP | 10-175270 | 6/1998 |
| JP | 11-010823 | 1/1999 |

OTHER PUBLICATIONS

Machine Translation of Jap. Pat Publication 11–010823, Jan. 19, 1999.*

* cited by examiner

Primary Examiner—Daniel Zirker
(74) Attorney, Agent, or Firm—Colene H. Blank

(57) ABSTRACT

An adhesive sheet is provided comprising a base layer, a protective layer disposed on the front surface of the base layer, and an adhesive layer disposed on the back surface of the base layer. The protective layer comprises a surface modifier for modifying the surface of the protective layer, a cured resin and inorganic oxide particles, and the adhesive sheet further comprises a cushion layer comprising an elastomer, disposed between the base layer and the protective layer. This adhesive sheet is suitable for use as a flooring adhesive sheet having high abrasion resistance.

12 Claims, 1 Drawing Sheet

ADHESIVE SHEET AND FLOOR SURFACE COVERED STRUCTURE

FIELD OF THE INVENTION

The present invention relates to an adhesive sheet comprising a base layer, a protective layer disposed on the front surface of the base layer, and an adhesive layer disposed on the back surface of the base layer, which is particularly suited for use as a flooring adhesive sheet, used for the purpose of decorating or protecting the floor surface of buildings.

BACKGROUND

Generally, flooring materials (e.g., plastic floors, stone material floors, coated floors, wood floors, etc.) disposed on the floor portion in rooms of buildings have a thickness of not less than 2 mm. These flooring materials are usually applied on the floor portion using an adhesive to form a floor surface in rooms of buildings. However, the following problems have occurred on re-application (replacement of floor materials) of these flooring materials.

(a) It is difficult to peel off the flooring material due to its comparatively large thickness, therefore requiring considerable time to replace it.

(b) A larger amount of waste materials are produced corresponding to the increased thickness of the flooring material after it is peeled off.

Therefore, a study has been conducted to use a decorative sheet as a flooring material covering layer. This decorative sheet is a decorative adhesive sheet that is also referred to as a facing sheet, and the total thickness of the sheet is usually less than 1 mm. Although the decorative sheet is often used for interior applications and covering or decorating of walls and ceilings, this study involved attempting to use this decorative sheet for covering a floor surface. Namely, this study was conducted to attempt to solve the above problems (a) and (b) by covering the surface of an applied floor material with a decorative sheet, and replace the decorative sheet instead of reapplying the flooring material.

The surface layer of this type of decorative sheet is typically made of a vinyl chloride resin that is superior in terms of cost and processability. In addition, polyolefin resin is also used for the surface layer. Normally, a printed layer is disposed on the surface layer to form a decorative sheet.

A polyvinyl chloride facing sheet has been proposed as an improved version of this type of decorative sheet in which a vinyl chloride layer is provided on a backing material followed by lamination of a fluorine polymer film as a protective layer thereon by means of an adhesive (Japanese Examined Patent Publication (Kokoku) No. 64-11752 and Japanese Unexamined Patent Publication (Kokai) No. 8-118553, etc.). As a result, this facing sheet has improved stain resistance and scratch resistance. Moreover, it has also been proposed to change the resin layer laminated on a backing material to an acrylic resin emulsion that is free of bleeding (oozing) of plasticizer to improve separation over time from the fluorine polymer film protective layer disposed on its surface (Japanese Patent Publication No. 2512003).

On the other hand, Japanese Unexamined Patent Publication (Kokai) No. 10-175270 teaches an interior facing sheet having superior resistance to staining due to dust. This facing sheet is formed by applying an acrylic resin emulsion to the surface of a backing material and drying the emulsion to a solid to form an acrylic resin layer followed by providing a fluorine polymer layer on the acrylic resin layer that contains an antistatic agent and antifungal agent. Examples of the material of the backing material include organic and inorganic fibers. In addition, an example of an antistatic agent that can be used is polyoxyethylene alkyl phosphate ester surfactant.

In addition, Japanese Unexamined Patent Publication (Kokai) No. 10-95087 teaches an improvement without using any fluorine polymer. The facing paper disclosed in this publication is composed of sequentially laminating a printed layer and a top coat layer on the surface of a paper substrate, the top coat layer comprising a transparent, two-part curable urethane resin containing a polymerized fluorine monomer (oligomer) having a hydrophilic group.

Moreover, Japanese Unexamined Patent Publication (Kokai) No. 6-240201 discloses a surface modifier for coating having superior stain resistance and water repellence, and a coating composition containing the surface modifier for coating. This surface modifier for coating is a fluorinated acrylic resin (polymer or oligomer) composed of, for example, a copolymer obtained by reacting $C_8F_{17}CH_2CH_2OCOCH=CH_2$ and $C_{18}H_{37}OCOCH=CH_2$. A coated film having excellent stain resistance and water repellence can be obtained by adding this surface modifier to a resin for hydroxyl group-containing polyester powder coating, a blocked isocyanate curing agent, a pigment, and dibutyltin laurate, mixing and grinding followed by kneading and grinding the mixture, spraying the coating composition onto a steel plate, and baking the composition for curing to obtain a coated film.

On the other hand, decorative sheets have also been proposed that are capable of preventing the surface of a facing material made of an inorganic plate material from being damaged by abrasion or scratching. For example, Japanese Unexamined Patent Publication (Kokai) No. 11-10823 discloses a decorative sheet in which a specific coating layer (protective layer) is formed on the surface of a substrate having a printed surface, the substrate being made of a plastic sheet or film. For example, the coating layer disclosed in Japanese Unexamined Patent Publication (Kokai) No. 11-10823 is composed of (A) spherical particles (beads) having an average particle diameter of 3 to 50 $\mu$m, and (B) a reactive resin, wherein the content of (A) is 5 to 50 wt % based on the total amount of (A) and (B). The above spherical particles are, for example, beads having alumina and so forth as their principal component. A decorative sheet having this type of coating layer effectively enhances the abrasion resistance of the surface in facing materials obtained by laminating the decorative sheet to various types of plate materials, and particularly those obtained by laminating the decorative sheet to inorganic plate materials.

Furthermore, none of the decorative sheets disclosed in the publications explained here were proposed with the intent of using as flooring adhesive sheets.

SUMMARY

The present invention provides an adhesive sheet comprising a base layer, a protective layer disposed on the front surface of the base layer, and an adhesive layer disposed on the back surface of the base layer, characterized in that, the protective layer comprises a surface modifier for modifying the surface of the protective layer, a cured resin and inorganic oxide particles, and the adhesive sheet further comprises a cushion layer comprising an elastomer, disposed between the base layer and the protective layer.

In addition, in another embodiment, the present invention provides a floor surface covered structure comprising a floor of a building, and the above adhesive sheet adhered on the surface of the floor.

This type of adhesive sheet and floor surface covered structure effectively enhances abrasion resistance.

DESCRIPTION OF REFERENCE NUMERALS

Figure 1:
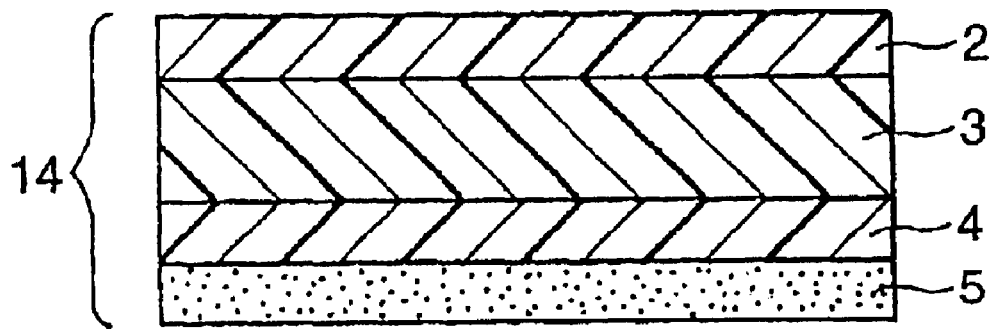
FIG. 1 is a cross-sectional view of an adhesive sheet of a first embodiment of the present invention.
Figure 2:
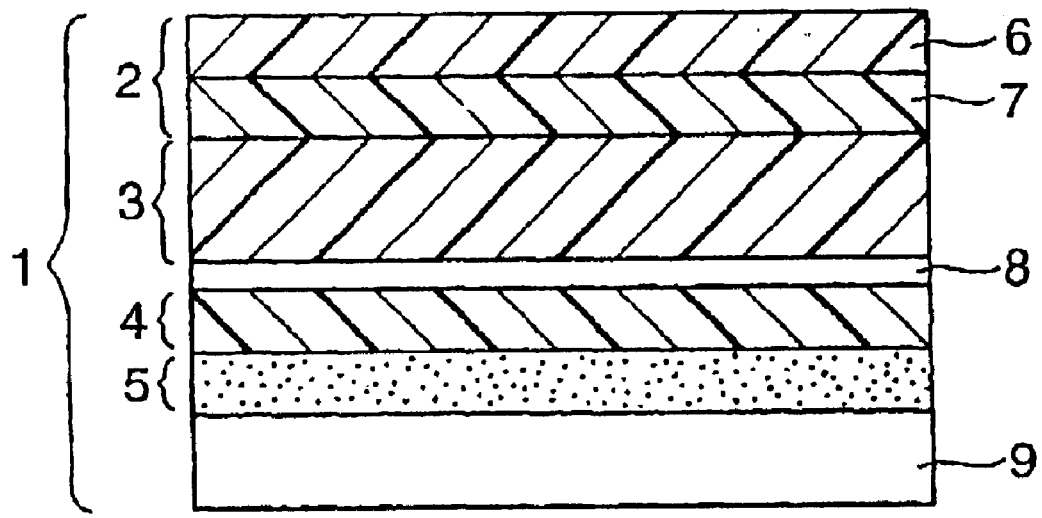
FIG. 2 is a cross-sectional view of an adhesive sheet of another embodiment of the present invention.

1: Adhesive sheet
2: Protective layer
3: Cushion layer
4: Base layer
5: Adhesive layer
6: Inorganic oxide particle-containing layer (surface layer)
7: Thermocured resin layer (primer layer)
8: Adhesive for lamination
9: Release paper

DETAILED DESCRIPTION

As a result of intensive research to use an ordinary decorative sheet as a flooring adhesive sheet, the inventors of the present invention found that the examples of the prior art have the following problems.

Flooring adhesive sheets end up being used in locations in buildings such as hotels and stores where there is relatively heavy pedestrian traffic by being adhered to the floor (floor material that constitutes the floor) for the purpose of effecting simple repair or for use as advertisements or guiding signs. Therefore, abrasive contact between the sole of shoes and the surface of the adhesive sheet will frequently occur. Thus, these sheets must be used as flooring materials by enhancing the abrasion resistance of the adhesive sheet surface. According to the aforementioned prior art, the abrasion resistance of the sheet surface can be effectively enhanced by using a protective layer containing spherical particles and surface modifier.

However, simply modifying the adhesive sheet surface was inadequate for attaining a practical level of abrasion resistance for use as a flooring adhesive sheet used in flooring, and particularly in locations of relatively heavy pedestrian traffic. Thus, the object of the present invention is to provide an optimum adhesive sheet for use as a flooring adhesive sheet wherein the abrasion resistance is effectively enhanced.

Adhesive Sheet

According to one characteristic of the adhesive sheet of the present invention, a protective layer disposed on the front surface of a base layer comprises a surface modifier for modifying the surface of the protective layer, a cured resin and inorganic oxide particles dispersed in the cured resin, while preferably, the protective layer comprises a layer containing a surface modifier, cured resin and inorganic oxide particles dispersed in the cured resin (to be referred to as the inorganic oxide particle-containing layer) at least as the layer of the uppermost surface (surface layer or outermost layer). In addition, the adhesive sheet of the present invention is also characterized by having a cushion layer comprising an elastomer that is disposed between the above base layer and the above protective layer. Due to these characteristics, the abrasion resistance of the adhesive sheet can be effectively enhanced. In addition, since there is no particular need to use fluorine polymer for the protective layer resin, production cost can be held to a low level. Thus, the adhesive sheet of the present invention can be optimally used as a decorative sheet which is intended for reapplication.

As shown in FIG. 1, the adhesive sheet (1) of the present invention is an adhesive sheet comprising a laminate comprising a base layer (4), cushion layer (3) fixed on that base layer (4) and protective layer (2) fixed on that cushion layer (3), and an adhesive layer (5) disposed on the back side (namely, the back side of the base layer) of that laminate. Thus, this adhesive sheet can be easily applied by adhering to the floor surface of buildings, transportation vehicles and aircraft and so forth in the same manner as ordinary tacky sheets and other adhesive sheets. In addition, since the thickness of the adhesive sheet can be made to be less than 1 mm in the same manner as ordinary decorative sheets, etc., it can be easily peeled off during reapplication, replacement can be performed in a short period of time, and the amount of waste material after peeling off can be reduced. Furthermore, the total thickness of the adhesive sheet is normally within the range of 100 to 700 $\mu$m, preferably 120 to 500 $\mu$m, and particularly preferably 130 to 300 $\mu$m.

In addition, the adhesive sheet of the present invention having the above configuration can also have scratch resistance of a level that is sufficiently suitable for the case of using for the purpose of protecting a floor surface (for example, the evaluation according to the pencil hardness test in accordance with the measurement in compliance with JIS K 5400 is 2H or higher).

Since the adhesive sheet of the present invention contains a cured resin and inorganic oxide particles dispersed in that cured resin, it is able to give the floor surface sufficient strength (abrasion resistance, scratch resistance, etc.) that is able to withstand use as a floor surface covered structure. In addition, even if the total thickness of the adhesive sheet is comparatively small, it is difficult to pick up irregularities in the adhered floor surface thereby allowing the adhesive sheet to enhance the smoothness of the sheet surface after adhesion. However, the thickness of the laminate comprising the base layer, cushion layer and protective layer is preferably 160 to 280 $\mu$m, and particularly preferably 170 to 250 $\mu$m. If the laminate is to thin, it is not possible to enhance the smoothness of the sheet surface after adhering to a floor surface and so forth, and there is the risk of not being able to give the floor surface sufficient strength to be able to withstand use as a floor surface covered structure. Conversely, if the laminate is too thick, the amount of waste material remaining after peeling is increased.

The adhesive sheet of the present invention comprises a cushion layer that acts to effectively enhance the abrasion resistance of the protective layer. Since the cushion layer is comparatively flexible, caution is required so that the rigidity of the entire sheet does not become excessively low. This is because it becomes difficult to apply (adhere) the adhesive sheet to the floor if the rigidity of the overall sheet becomes low. Thus, it is preferable to suitably determine the material and content of layers other than the cushion layer so as to increase the rigidity of the sheet. For example, it is necessary that the protective layer contain a cured resin. From the same point of view, it is preferable that the content of inorganic oxide particles be as high as possible. The following provides a detailed explanation of the material and so forth of each layer.

Protective Layer

The protective layer may be a single layer comprising only an inorganic oxide particle-containing layer, or a laminate comprising a plurality of layers that include an inorganic oxide particle-containing layer. In the case of a laminate, preferably at least the layer of the uppermost surface (surface layer or uppermost layer) is the inorganic oxide particle-containing layer. However, a thin surface coating of cured resin for protecting the inorganic oxide particles can also be disposed on this type of inorganic oxide particle-containing layer.

Although a layer comprising only an inorganic oxide particle-containing layer as described above can be used as a protective layer, the protective layer preferably comprises (a) a surface layer comprising an inorganic oxide particle-containing layer, and (b) a primer layer disposed between the surface layer and a cushion layer. The cushion layer is a layer that contains elastomer. If the primer layer is present, the protective layer can be fixed to this layer with a high fixing strength (adhesive strength), thereby making it possible to effectively enhance the durability and abrasion resistance of the adhesive sheet. Furthermore, a detailed description of the primer layer will be provided below.

Although there are no restrictions on the thickness of the inorganic oxide particle-containing layer in the above protective layer provided it does not impair the effect of the present invention, it is normally 10 to 150 μm, and preferably 20 to 120 μm. If this layer is too thin, there is the risk of decreased abrasion resistance, and conversely if this layer is too thick, the pliability of the entire sheet decreases resulting in the risk of making it difficult to peel off during reapplication.

In addition, a cured resin layer separate from that in the inorganic oxide particle-containing layer may be disposed between the inorganic oxide particle-containing layer and primer layer to enhance their adhesion. The thickness of this cured resin layer is normally 1 to 50 μm. Furthermore, in order to control the total thickness of the adhesive sheet within the desired range, the total thickness of the protective layer is preferably 50 to 200 μm, and particularly preferably 60 to 150 μm.

In addition to the above essential components including the cured resin and surface modifier, the inorganic oxide particle-containing layer of the above protective layer may also contain other additives, examples of which include surfactants, fillers, flame retardants, ultraviolet absorbers, oxidation stabilizers, tackifying resins, colorants and antifungal agents. Preferably, however, the content of the other additives not more than 20 parts by weight relative to 100 parts by weight of cured resin. Here, the term "cured resin" used in the present specification refers to a cured "curable resin". In addition, when it is necessary to add a curing component such as a curing agent, crosslinking agent, curing accelerator, polymerization initiator or catalyst to the curable resin, the term "cured resin" refers to the cured mixture of a curable resin and a curing component.

The inorganic oxide particle-containing layer can be formed by, for example, forming a slurry containing a curable resin and so forth for forming a cured resin, and then coating, drying and curing that slurry. When mixing each of the slurry components, if the concentration of the non-volatile component of a solution of a binder (curable resin and if contained, curing component), is adjusted in advance within the range of 20 to 40 wt %, a slurry is obtained having satisfactory coatability. Since a slurry obtained in this manner contain particles, it is suited for coating with a notch bar, round bar, etc.

Cured Resin

The cured resin constitutes a matrix for retaining inorganic oxide particles described below. There are no particular restrictions on the curable resin for forming a cured resin provided it forms a cured resin having excellent transparency and abrasion resistance after curing. Examples of curable resin include urethane resin, acrylic resin, polyester resin, silicone resin and epoxy resin, and urethane resin is particularly preferable. This is because urethane resin is able to effectively enhance the abrasion resistance of the inorganic oxide particle-containing layer since it demonstrates good adhesion with the inorganic oxide particles and has comparatively high toughness. Specific examples of these resins include urethane resin manufactured by Nippon Polyurethane Co., Ltd. under the trade name "SH-1011". In addition, a cured resin is preferably obtained by curing a curable resin prepared by adding a curing agent (for example, a curing agent manufactured by Nippon Polyurethane Co., Ltd. under the trade name of "COLONATE EX") to the resin.

In the case a curing component such as a curing agent is required, the content of that curing component is normally not more than 50 parts by weight, preferably not more than 30 parts by weight, and particularly preferably not more than 20 parts by weight, relative to 100 parts by weight of the curable resin.

The elastic modulus of the cured resin is preferably within the range of $1 \times 10^9$ to $1 \times 10^{15}$ dyn/cm$^2$. This is because, if the elastic modulus is within this range, abrasion resistance can be effectively enhanced while maintaining satisfactory pliability of the entire adhesive sheet. In addition, the surface hardness of the cured resin (measured in accordance with the previously described pencil hardness test) is normally within the range that is harder than "H". This degree of hardness allows scratch resistance to be effectively enhanced.

In the case the base layer of the adhesive sheet comprises a decorative layer such as a printed layer, it is preferable that the cured resin (cured curable resin) have a high degree of transparency so that the decorative layer can be seen satisfactorily. The light transmittance of the cured resin in this case is normally not less than 70%, preferably not less than 80%, and particularly preferably not less than 90%. Here, "light transmittance" in the present specification refers to light transmittance measured with the procedure in accordance with the "procedure for measurement of light transmittance" defined in JIS K 7105.

Curing of the curable resin using heat or radiation (ultraviolet light or electron beam) is most effective from the viewpoint of shortening curing time. In the case of curing by heating, there are cases in which it is normally necessary to heat the curable resin at 120 to 200° C. for 1 to 20 minutes. In addition, in the case of irradiating with ultraviolet light or an electron beam, etc., there is the risk of heat equal to or greater than that described above being applied to the protective layer. For example, as is described below, in the case the base layer has a printed layer for the decorative layer, the printed layer may be subjected to heat damage if exposed to such high temperatures. Thus, to prevent the base layer from being exposed to such high temperatures for a comparatively long period of time (several minutes to several tens of minutes), curing of the protective layer is preferably performed before laminating with the base layer. However, in cases when it is not necessary to shorten curing time, a moisture-curable resin, cold-curable resin or a resin capable of curing at a comparatively low temperature (temperature of not higher than 100° C.) can also be used as a curable resin to prevent heat damage of the base layer.

Inorganic Oxide Particles

In addition to improving the abrasion resistance and scratch resistance of the adhesive sheet, inorganic oxide particles also act to strengthen the rigidity of the adhesive sheet. When expressed as the Mohs hardness, for example, the hardness of the inorganic oxide particles is normally not less than 6, preferably not less than 7, and particularly preferably not less than 8. In addition, in the case the inorganic oxide particles are inorganic oxide beads, their Vickers hardness is preferably no less than 500 kg/mm$^2$. If the hardness is less than 500 kg/mm$^2$, there is the risk of decreased abrasion resistance. Here, "Vickers hardness" is the value measured using a microhardness tester of the exposed surface of beads of a cylindrical sample having a diameter of about 3 cm and a height of about 1 cm, which is formed by mixing about ten to twenty inorganic oxide beads having a particle diameter of about 1 mm with 10 g of an epoxy resin, curing the mixture and polishing the surface thereof. Furthermore, the measuring load during measurement is 300 g and the loading time is 15 seconds.

Moreover, in the case the base layer comprises a decorative layer (printed layer), it is preferable that the protective layer have sufficient transparency so that the protective layer can be easily seen. In such cases, inorganic oxide beads such as ceramic beads or glass ceramic beads are preferable as the inorganic oxide beads. Moreover, it is preferable that such beads have a high degree of transparency and as large a diameter as possible. The diameter of the beads normally 5 to 100 μm, and preferably 10 to 50 μm. Here, the diameter of the beads can be measured using a image processing device by a light microscope.

The refractive index of the inorganic oxide particles, and preferably inorganic oxide beads, is preferably almost the same as that of the cured resin so as to enhance the transparency of the inorganic oxide particle-containing layer. Thus, the refractive index of the inorganic oxide beads is preferably within the range of 1.3 to 1.9. Preferable examples of such inorganic oxide particles include those containing alumina, silica, titania or zirconia. These inorganic oxide particles are able to increase the adhesive action (affinity) with the resin of the protective layer and realize high abrasion resistance in particular. In addition, the inorganic oxide particles are preferably subjected to surface treatment with a silane coupling agent so as to improve the adhesion with the resin.

Alumina-containing beads are particularly preferable as inorganic oxide particles. Specific examples of such beads include alumina beads manufactured by Showa Denko Co., Ltd. under the trade name of "CB A40".

From the viewpoint of improving abrasion resistance and strengthening the rigidity of the adhesive sheet, the content of inorganic oxide particles should be as high as possible. However, if the content of inorganic oxide particles is too high, there is the risk of the inorganic oxide particles easily coming out of the cured resin. Thus, the content of inorganic oxide particles is preferably 100 to 450 parts by weight, and particularly preferably 110 to 400 parts by weight, relative to 100 parts by weight of cured resin (non-volatile component).

Surface Modifier

The surface modifier contained in the protective layer has an action of preventing soiling of the surface of the protective layer by dust, etc. The surface of the protective layer is formed by a plurality of fine irregularities derived from the inorganic oxide beads. Thus, in the case dust becomes adhered to the surface, the area of contact between the dust and surface of the protective layer becomes comparatively large as compared with that in the case of dust adhering to a smooth surface. In such cases, it is necessary to reduce surface tension by modifying the surface of the protective layer so that soiling composed of dust and so forth can be simply wiped off without polishing unnecessarily strongly. The surface modifier is usually a silicone or fluorine surface modifier.

As a means for reducing the surface tension of the surface of the protective layer, a surface modifier for coating disclosed in the above-mentioned Japanese Unexamined Patent Publication (Kokai) No. 6-240201 can be contained in the surface layer of the protective layer. Non-ionic surface modifier is preferable for such a modifier. As a result, the surface modifier easily bleeds from the interior of the surface layer to the surface, and the surface can be continuously maintained as a fluorine surface. The fluorine surface modifier is preferably an oligomer compound that is a liquid at normal temperatures (about 25° C.). Its viscosity at about 25° C. is normally less than 50 cps, and particularly preferably within the range of 1 to 30 cps. If the viscosity is too high, there is the risk of it becoming difficult for the surface modifier to bleed from the interior of the surface layer to the surface. Conversely, if the viscosity is too low, there is the risk of decreased duration of surface modifying effects.

The content of the surface modifier is normally 0.1 to 10 parts by weight, preferably 0.5 to 5 parts by weight, and particularly preferably 1 to 3 parts by weight, relative to 100 parts by weight of cured resin (non-volatile component). If the content of the surface modifier is too low, there is the risk of decreased duration of surface modifying effects. In addition, even if the content of the surface modifier is greater than what is required, stain resistance effects do not improve that much, and conversely, there is the risk of the appearance of detrimental effects (such as the occurrence of coating defect when forming the protective layer).

Fluorine compounds having the following chemical structure, for example, can be used for the above-mentioned surface modifier. Namely, these include surfactants having a perfluoroalkyl group, in which all hydrogen atoms of the alkyl group in the molecule are substituted with fluorine atoms, and a hydrophilic group (hydroxyl group, etc.) or lipophilic group. Such compounds perform surface modification of a surface layer by utilizing the surface migration property of the perfluoroalkyl group, and are able to modify the surface by migrating to the layer surface when a small amount is added. Specific examples include the fluorine surface modifiers of the DEFENSA series manufactured by Dainippon Ink Chemical Industries Co., Ltd. under the trade names of "MCF-300", "MCF-310", "MCF-312" and "MCF-323".

Cushion Layer

The cushion layer acts to effectively enhance the abrasion resistance of the protective layer. In addition, it also fulfills the role of a transparent film layer that covers the printed layer. This type of transparent film is effective for protecting the printed layer even in the case the protective layer is abraded. Namely, as a result of having this multi-layer structure (protective layer and transparent film layer) for covering the printed layer, the printed layer can be even more effectively protected. The thickness of transparent film layer (cushion layer) is normally 5 to 200 μm, preferably 10 to 180 μm and particularly preferably 50 to 160 μm. The light transmittance of the cushion layer is normally not less than 65% and preferably not less than 75% in order to allow the printed layer to be seen easily.

The elastomer of the cushion layer is normally a thermoplastic elastomer. This is because a thermoplastic elastomer has excellent cushioning effects that enhance the abrasion resistance of the protective layer. Examples of such elastomers that can be used include olefin elastomer, styrene copolymer elastomer, urethane elastomer, acrylic elastomer, ester elastomer and silicone elastomer.

The elastomer of the cushion layer is preferably an elastomer that contains ethylene copolymer. This is because this elastomer has excellent cushioning effects that enhance the abrasion resistance of the protective layer, extremely enhances the abrasion resistance of the cushion layer itself, and has excellent protective effects for the printed layer in the form of the above-mentioned transparent film layer.

Preferable examples of ethylene copolymer elastomers that can be used include ionomers, ethylene-propylene rubber and blends thereof. Moreover, blends of these elastomers with other polymers can also be used. Here, an ionomer is an ionic copolymer that contains an alkali metal or alkaline earth metal and has ion-crosslinked bonds formed by the metal ions. An example of an ionomer is a salt of ethylene-acrylate copolymer.

The elastomer contained in the cushion layer demonstrates rubber elasticity at normal temperature (about 25° C.), and has a comparatively high rupture elongation. Rupture elongation as determined in the tensile test performed according to JIS K-7113 is normally not less than 220%, preferably within the range of 250 to 850%, and particularly preferably within the range of 280 to 800%. If rupture elongation is too low, cushioning decreases and there is the risk of the cushion layer being unable to effectively enhance the abrasion resistance of the adhesive sheet. On the other hand, if the rupture elongation is too high, there is the risk of the mechanical strength (durability) of the overall sheet decreasing.

The cushion layer is formed, for example, by coating a coating solution containing the above elastomer onto a processing substrate or onto a printed layer of a base layer, and solidifying the coating solution. Examples of coating means that can be used include ordinary coating means such as a dye coater, knife coater, roll coater, bar coater, curtain coater and other types of coaters. The cushion layer formed on a processing substrate is normally adhered onto the base layer with a printed layer by means of an adhesive for cushion layer lamination. In addition, the cushion layer can also be manufactured in the form of a cushion layer film by extrusion molding. In addition, by additionally forming a protective layer on the cushion layer formed on a processing substrate, the cushion layer can be adhered to the base layer in the form of a protective film having a cushion layer.

In addition, provided the effect of the present invention is not impaired, additive can be contained in the cushion layer, examples of which include curing agents, crosslinking agents, polymerization initiators, catalysts, surfactants, fillers, flame retardants, ultraviolet absorbers, oxidation stabilizers, tackifying agents and colorants.

Base Layer

The base layer is required to have the role of a support for supporting the laminate of the adhesive sheet, thereby satisfactorily maintaining the mechanical strength of the entire sheet. In the case of having a printed layer for imparting a decorative appearance to the sheet surface, it also function as a layer for supporting this printed layer.

The base layer can be formed from any base layer that is used as the base material of an ordinary adhesive sheet, examples of which include paper, resin film and metallic film. Examples of resin films that can be used include vinyl chloride resin (including copolymers of vinyl chloride and other vinyl monomers), polyolefin resin, urethane resin, acrylic resin, polyester resin and silicone resin (including silicone polyurea resin). Examples of metallic films that can be used include metallic foils such as aluminum foil and copper foil. In the case of using a metallic foil for the base material, the adhesive sheet can be adhered by satisfactorily following the joints of tiles. The thickness of the base layer is normally 10 to 80 µm, and preferably 15 to 50 µm. The thickness of the base layer here refers to the total thickness of the printed layer and base layer in the case the base layer contains a printed layer.

Printed Layer

The printed layer is a layer for imparting a decorative effect that is formed by coloring the base layer or providing an image such as characters or a design on the surface. This base layer may be disposed on (1) the outermost surface of the base layer, (2) the interior of the base layer, or (3) the back surface of the base layer (side in contact with the adhesive layer). In the case the base layer contains such a decorative layer, the adhesive sheet of the present invention can be used as a decorative sheet. Namely, this is a decorative adhesive sheet wherein the above base layer has a decorative layer that allows observation of the decorative appearance from its surface, and the above cushion layer and protective layer allow the transmission of light. The light transmittance of the cushion layer is normally not less than 65% and preferably not less than 75%. In addition, the light transmittance of the protective layer is also normally not less than 65% and preferably not less than 75%. If the light transmittance of the cushion layer or protective layer is too low, there is the risk of decorative appearance not being able to be observed satisfactorily. In addition, light transmittance tends to decrease due to abrasion of the surface during use, and if the light transmittance of the protective layer is too low, the replacement frequency of the adhesive sheet increases, which is not economical. Thus, the light transmittance of the cushion layer and protective layer is particularly preferably not less than 80%.

The printed layer can be formed in the same manner as the printed layer of a conventional decorative sheet. For example, it can be formed using printing ink by a means such as screen printing, gravure printing and thermal transfer printing. The thickness of the printed layer can be determined in the same manner as the case of a printed layer in a conventional decorative sheet. In addition, a metallic layer having a metallic appearance that contains a metal vapor deposition layer can be used in place of the above printed layer. Moreover, a combination of a metallic layer and a printed layer formed thereon can also be used as a decorative layer.

Furthermore, the printed layer may be formed on the surface of a base layer after disposing an adhesive layer on the backside surface of the base layer. Alternatively, the printed layer may be formed on the surface of the base layer before disposing an adhesive layer on the backside surface of the base layer. In addition, an adhesive layer may be finally disposed after disposing a protective layer and cushion layer on the surface of a base layer provided with a printed layer prior to disposing that adhesive layer.

Adhesive Layer

The adhesive layer can be formed from a pressure-sensitive adhesive, heat-sensitive adhesive and hot melt adhesive in the same manner as the case of an ordinary adhesive sheet. In addition, a re-releasable pressure-sensitive adhesive is preferably used for the pressure-sensitive adhesive. This is because a re-releasable pressure-sensitive adhesive makes it easier to peel off the adhesive sheet of the present invention during reapplication. In addition, fine irregularities are formed in the adhesive surface of the adhesive layer as a result of being transferred from a release paper (liner) having fine irregularities in its surface, thereby making it possible to control the adhesive strength and improve the escape of air bubbles at the time of application.

The re-releasable pressure-sensitive adhesive can be obtained by, for example, mixing elastic microspheres obtained by suspension polymerization with a tacky polymer solution obtained by emulsion polymerization. Polyacrylate is preferable for the material of the elastic microspheres since it is readily available and facilitates control of the rubber elasticity and adhesion. The compression modulus of the microspheres is preferably within the range of $1 \times 10^4$ to $1 \times 10^7$ dyne/cm$^2$. If the compression modulus is within this range, the microspheres themselves are effectively deformed and the re-releasability is satisfactory. Compression modulus is measured at 20° C. using the "RSA II (trade name)" viscoelastic spectrometer. On the other hand, the tacky polymer refers to a polymer which demonstrates tacky properties at normal temperature and can be used as a pressure-sensitive adhesive. Examples of such polymers that can be used include polyacrylate, polyurethane, polyolefin and polyester. The molecular weight of the tacky polymer should be within the range that allows its prescribed adhesive properties to be demonstrated, and the weight average molecular weight is normally within the range of 10,000 to 100,000.

The re-releasable pressure-sensitive adhesive layer can be formed by forming a coated film from a pressure-sensitive adhesive containing the elastic microspheres and tacky polymer using ordinary coating means. The re-releasable pressure-sensitive adhesive layer has a large number of protruding adhesive portions derived from the elastic microspheres. The mixing ratio of the elastic microspheres and tacky polymer is such that the content of elastic microspheres relative to 100 parts by weight of tacky polymer is normally within the range of 20 to 500 parts by weight, and preferably within the range of 100 to 400 parts by weight.

The thickness of the adhesive layer is normally 10 to 100 μm and preferably 15 to 60 μm. If the adhesive layer is too thin, adhesion to a covered surface such as a floor surface decreases, resulting the risk of decreased durability and so forth. Conversely, if the adhesive layer is too thick, there is the risk of it being difficult to control the total thickness of the sheet to a prescribed thickness while forming the protective layer and cushion layer at a sufficient thickness.

Primer Layer

The protective layer of the adhesive sheet of the present invention can contain a primer layer for enhancing the adhesion between the cushion layer and inorganic oxide particle-containing layer. The primer layer is normally a layer containing a resin having high transparency. Examples of resins that can be used include vinyl chloride resin (including copolymers of vinyl chloride and other vinyl monomers), urethane resin, acrylic resin, polyester resin and silicone resin (including silicone polyurea resin). in addition, when the adhesive sheet is a decorative sheet such as in the case of the base layer having a printed layer, the light transmittance of the resin is normally not less than 70%, preferably not less than 80%, and particularly preferably not less than 90%.

Although there are no particular restrictions on the thickness of the primer layer, it is normally 5 to 80 μm and preferably 10 to 50 μm. If the primer layer is too thin, the adhesion between the inorganic oxide particle-containing layer and cushion layer decreases, resulting in the risk of decreased abrasion resistance. Conversely, if the primer layer is too thick, there is the risk of it becoming difficult to control the total thickness of the sheet to a prescribed thickness while forming the inorganic oxide particle-containing layer at a sufficient thickness.

The primer layer can contain additives such as curing agents, crosslinking agents, polymerization initiators, catalysts, surfactants, fillers, flame retardants, ultraviolet absorbers, oxidation stabilizers, tackifying agents and colorants, provided they do not impair the effect of the present invention. The primer layer can also be formed by forming a coated film from a coating solution containing a primer layer resin using an ordinary coating means.

Antifungal Agent

The protective layer may also contain an antifungal agent as another additive, provided it does not impair the effect of the present invention. For example, there are many cases in which bacteria or sporangia of molds are adhered to the dust adhered to the surface of the protective layer, and thus adhesion of dust means contamination by mold. There are cases in which the molds remain even if the dust is wiped off. Therefore, an antifungal agent is preferably added to at least the surface layer of the protective layer in order to impart the effect of preventing contamination by molds. The content of antifungal agent is normally 0.01 to 2 parts by weight, and preferably 0.05 to 1 part by weight, relative to 100 parts by weight of cured resin (non-volatile component). If the content of antifungal agent is too low, there is the risk of decreased duration of the effect, while if the content of antifungal agent exceeds the required amount, in addition to the effect not being improved, there is the risk of the occurrence of detrimental effects (e.g., occurrence of defects in the coated film during formation of the protective layer). Those antifungal agents that can be used include both "antibacterial agents" in the narrow sense for sterilizing bacteria or inhibiting bacterial growth, and "fungiproof agents" in the broad sense for sterilizing molds or inhibiting mold growth.

Production of Adhesive Sheet and Floor Surface Covered Structure

The adhesive sheet of the present invention can be produced in the same manner as the case of producing an ordinary adhesive sheet by sequentially laminating each layer on a base layer and applying an adhesive layer to the back of the base layer. However, a protective layer and cushion layer are preferably first prepared for use as a protective film with cushion layer, after which the adhesive sheet is formed by laminating this protective film with a separately prepared base layer. Furthermore, application of the adhesive layer to the back side of the base layer may be performed before lamination of the protective film and base layer or after this lamination.

The protective film with cushion layer can be produced in the manner described below. Namely, the protective film with cushion layer can be produced by the method comprising the following steps (1) through (3):

(1) a cushion layer in the form of a cushion layer film is prepared by, for example, extrusion molding;

(2) a protective film, comprising (a) a surface layer containing surface modifier, a curable resin, and inorganic oxide particles dispersed in the curable resin, and (b) a primer layer disposed between the surface layer and the above cushion layer, is laminated onto the above cushion layer via the primer layer disposed in between, followed by curing the curable resin of the protective film to obtain a protective film with cushion layer; and, (3) the above protective film with cushion layer is fixed on the surface of the above base layer. According to this method, in addition to it being easy to produce an adhesive sheet having the excellent performance described above, the following advantages can also be obtained. Namely, since the cushion layer and protective layer (protective film) are mutually adhered with a high adhesive force, the abrasion resistance and durability (including the absence of the occurrence of peeling of the protective film) of the adhesive sheet are improved. In addition, in the case where the base layer (decorative layer) is susceptible to thermal damage, for example, in the case of providing a decorative layer such as a printed layer that can be observed from the surface of the base layer either on the surface or in the interior of the base layer, such damage to the base layer can be effectively prevented. Normally, it is most effective to cure the curable resin using heat or radiation (e.g., ultraviolet light or electron beam) (since this allows curing time to be shortened). At this time, it is effective for protecting the base layer from the heat accompanying heating or irradiation to complete curing of the protective layer before laminating the base layer and the protective layer on which the cushion layer is fixed to its surface. Thus, such damage to the base layer can be effectively prevented with a production method comprising the above steps (1) through (3).

The floor surface covered structure of the present invention can be produced by applying the adhesive sheet of the present invention onto the surface of the floor of a building and so forth. The floor surface covered structure to which the adhesive sheet has been applied is characterized in that, in a floor surface covered structure comprising the floor of a building and so forth (namely, finished flooring disposed on the floor portion) and the sheet fixed by means of an adhesive layer to the floor surface (flooring surface)), the above adhesive sheet has (i) a base layer, (ii) a cushion layer disposed on the surface of the base layer, and (iii) a protective layer disposed on the surface of the cushion layer, and the above protective layer contains surface modifier, cured resin and inorganic oxide particles dispersed in the cured resin. This floor surface covered structure has a sufficient level of abrasion resistance that is suitable for protection of floor surfaces.

EXAMPLES

First, a protective film having cushion layer used in the present example was formed in the following manner. This protective film functions as a cushion layer and protective layer.

1. Ionomer (manufactured by Mitsui-Dupont under the trade name "Hi-Milan 1652", rupture elongation: 400%) was melted and extrusion molded on PET film (processing substrate) using a T die to form a cushion layer having a thickness of 150 $\mu$m.

2. The composition mixed in accordance with the primer layer formation shown in Table 1 was coated onto the cushion layer and dried for 2 minutes at 90° C. to provide a first thermocured resin layer (primer layer) having a thickness of 15 $\mu$m.

3. Subsequently, the above primer layer was coated with a composition mixed according to the surface layer formulation of Table 1 to form a second thermocured resin layer (surface layer), thus forming a laminate comprising a cushion layer, primer layer and surface layer. This laminate was then dried and cured by heating at 100° C. for 1 minute and further heating at 160° C. for 4 minutes and 30 seconds. As a result, the thickness of the protective layer comprising the thermocured resin layer and inorganic oxide particle-containing layer was 40 $\mu$m.

TABLE 1

Formulation of Protective Film having Cushion Layer

| Cushion Layer | | Example Ionomer | Comp. Example PVC |
|---|---|---|---|
| Primer layer formulation | SH-1011 | 100 | |
| | Colonate HX | 5 | |
| Surface layer formulation | SH-1011 | 100 | |
| | Colonate HX | 5 | |
| | CB A40 | 35 | |
| | Amenitop | 0.4 | |
| | MCF-312 | 2.4 | |

In the above table, "SH-1011 (trade name)" denotes a polyurethane resin coating composition manufactured by Nippon Polyurethane Industry Co., Ltd. and the solid content (non-volatile component) is 30 wt %. In addition, "Colonate HX (trade name)" denotes an isocyanate curing agent manufactured by Nippon Polyurethane Industry Co., Ltd. and the solid content (non-volatile component) is 100 wt %. "CB A40 (trade name)" denotes alumina beads having an average particle diameter of 40 $\mu$m and Vickers hardness of 2500 kg/mm$^2$ manufactured by Showa Denko Co., Ltd. "Amenitop (trade name)" is an antifungal agent manufactured by Matsushita Denko Co., Ltd.. "MC-312 (trade name)" denotes a fluorine surface modifier of the previously mentioned Defensa series manufactured by Dainippon Ink Chemical Industries Co., Ltd.

When the light transmittance of the above protective film with cushion layer was measured so that light travels towards the cushion layer side from the inorganic oxide particle-containing layer (surface layer) side using the procedure of measuring light transmittance in accordance with JIS K 7105, it was found to be about 84%.

On the other hand, a base layer with printed layer having a thickness of 20 $\mu$m was prepared separately from the above. The base layer was formed from vinyl chloride resin, and printing was performed on that layer.

The PET film was peeled from the protective film with cushion layer obtained in the above manner and laminated with the base layer with printed layer to obtain an adhesive sheet precursor without an adhesive layer. Furthermore, lamination of the protective film having cushion layer to the base layer was performed in the manner described below using a two-part urethane adhesive. First, the above urethane adhesive was applied onto the base layer, the above cushion layer was placed on top and pressure was applied to complete lamination. Here, the urethane adhesive was formed as a blend of "XN-1011 (trade name)" manufactured by Nippon Polyurethane Industry Co., Ltd. and "Colonate HX (trade name)" manufactured by Nippon Polyurethane Industry Co., Ltd. at a ratio of 100:10 (weight ratio). Moreover, this adhesive sheet precursor was laminated with an adhesive layer (with release paper) formed by coating an acrylic adhesive onto release paper to a thickness of 40 μm and drying. In this manner, the adhesive sheet of the present example was completed in the form of a laminate comprising a protective layer (2) consisting of inorganic oxide particle containing-layer (surface layer) (6) and thermocured resin layer (primer layer) (7); cushion layer (3); adhesive layer (8) for laminating cushion layer (3) and base layer (4); base layer (4); adhesive layer (5); and, release paper (9).

Comparative Examples

With the exception of using a transparent PVC film layer having a thickness of 150 μm (comprising a vinyl chloride resin manufactured by Bando Chemical Co., Ltd., and having rupture elongation of 100 to 200%) instead of the above cushion layer, the adhesive sheet of the present example was completed in the same manner as in the example (refer to the aforementioned Table 1).

The following provides an explanation of the performance tests of the adhesive sheets of the respective examples.

(1) Abrasion Resistance

The test was performed under conditions of S-42 abrasive paper at a load of 1 kg using a taber abrasion tester followed by measurement of the number of revolutions until the printed layer disappears. Thus, the number of revolutions until the printed layer disappears is the number of revolutions, until the protective layer is abraded, the cushion layer is abraded and finally the printed layer is abraded (disappears). The test results are shown in Table 2. Abrasion resistance of the cushion layer was tested by performing the test on the adhesive layer formed in the same manner as each of the examples with the exception of not providing a protective layer. Thus, the number of revolutions until the printed layer disappears is the number of revolutions until the cushion layer is abraded and then the printed layer is abraded (disappears).

TABLE 2

Results of Abrasion Resistance Test

| Abrasion Resistance | Example | Comparative Example |
| --- | --- | --- |
| Protective layer + cushion layer | 1,200 | 800 |
| Cushion layer | 1,000 | 650 |

(2) Scratch Resistance

As a result of performing the pencil hardness test by measuring in accordance with JIS K 5400, both the example and comparative example demonstrated hardness of 4H.

(3) Stain Resistance

The adhesive sheet of the examples were applied to a floor surface, the surface was washed with water after one week, and a visual comparison of the stained state was made. As a result, all of the adhesive sheets tested maintained the same level of clean state when compared with the sheets prior to testing, and all were found to demonstrate excellent stain resistance. However, in the case the surface layer did not contain a surface modifier, the adhesive sheet became stained to an extent which was distinguishable from that of the adhesive sheet prior to testing, and stains were adhered to the degree that they could not be removed even by washing with water.

The adhesive sheet of the present invention effectively enhances abrasion resistance.

What is claimed is:

1. An adhesive sheet comprising a base layer, a protective layer disposed on the front surface of the base layer, and an adhesive layer disposed on the back surface of the base layer, characterized in that, the protective layer comprises a surface modifier for modifying the surface of the protective layer, a cured resin and inorganic oxide particles, and the adhesive sheet further comprises a cushion layer comprising an elastomer, disposed between the base layer and the protective layer.

2. The adhesive sheet according to claim 1 wherein the cured resin is selected from the group consisting of urethane resin, acrylic resin, polyester resin, silicone resin and epoxy resin.

3. The adhesive sheet according to claim 1 wherein the inorganic oxide particles are inorganic oxide beads.

4. The adhesive sheet according to claim 1 wherein the inorganic oxide particles are selected from the group consisting of alumina, silica, titania or zirconia.

5. The adhesive sheet according to claim 1 wherein the surface modifier is a fluorine containing surface modifier.

6. The adhesive sheet according to claim 1 wherein the adhesive layer is selected from the group consisting of pressure-sensitive adhesives, heat-sensitive adhesives and hot melt adhesives.

7. The adhesive sheet according to claim 1 wherein the protective layer comprises, as an outermost layer, a layer containing the surface modifier, the cured resin and the inorganic oxide particles.

8. The adhesive sheet according to claim 7 wherein the protective layer further comprises a primer layer disposed between the outermost layer and the cushion layer.

9. The adhesive sheet according to claim 1 wherein the base layer is selected from the group consisting of paper, metallic film or resin film.

10. The adhesive sheet according to claim 1 wherein the base layer comprises a printed layer.

11. The adhesive sheet according to claim 1 wherein the elastomer contains an ethylene copolymer, said ethylene copolymer being selected from the group consisting of an ionomer, ethylene-propylene rubber and a mixture thereof.

12. A floor surface covered structure comprising a floor of a building, and the adhesive sheet of claim 1 adhered on the surface of the floor.

* * * * *